106. COMPOSITIONS, COATING OR PLASTIC.

83

UNITED STATES PATENT OFFICE.

LAWRENCE E. BARRINGER, OF SCHENECTADY, NEW YORK, ASSIGNOR TO GENERAL ELECTRIC COMPANY, A CORPORATION OF NEW YORK.

CEMENTING AND PROTECTING COMPOSITION.

1,423,985.  Specification of Letters Patent.  Patented July 25, 1922.

No Drawing.  Application filed November 18, 1919.  Serial No. 338,939.

*To all whom it may concern:*

Be it known that I, LAWRENCE E. BARRINGER, a citizen of the United States, residing at Schenectady, in the county of Schenectady, State of New York, have invented certain new and useful Improvements in Cementing and Protecting Compositions, of which the following is a specification.

The present invention comprises a new composition useful as a cement, or for insulating and protecting electrical apparatus, such, for example, as resistance coils. It is the object of my invention to provide a material which is water-proof and resistant to temperature changes such as ordinarily encountered in the operation of electrical apparatus.

The composition constituting my invention contains a hard natural resin, such, for example, as shellac, copal or rosin and a silicate of an alkali metal.

In preparing the composition constituting my invention the natural resin is dissolved in an aqueous solvent, such as ammonia. For example, one part by weight of shellac is mixed with about 2½ parts by weight of hot water, and ¼ part by weight of ammonia of a specific gravity of .910. This mixture is thoroughly agitated until a thick solution is obtained which may be thinned with water to a specific gravity of about 1.015. To this shellac solution is added a sufficient quantity of soluble silicate, as, for example, sodium silicate. Preferably to 1½ parts by volume of the shellac solution prepared as above described, are added about 10 parts by volume of the solution of sodium silicate having a specific gravity of about 1.460. The specific gravity of the resulting mixture should be about 1.380 at 21° C. A suitable filler such, for example, as silex is preferably added and if desired a suitable coloring agent such as ultra-marine blue may also be added, the whole producing a smooth homogeneous paste. Various other fillers such as powdered mica, feldspar, whiting or chalk may be likewise used to produce a paste.

The resulting composition may be used for cementing together various parts of electrical apparatus, as, for example, for sealing electrode wires in spark plugs or cementing bushings and the like in electrical apparatus. The composition also may be used as a protective coating on electrical devices such as coil resistances subjected to atmospheric conditions. For example, resistance coils mounted on suitable insulating supports may be dipped into a composition, as above prepared, which has been suitably thinned. The coils are then thoroughly air dried and finally baked for about twelve hours in an oven which is maintained at a temperature of about 100 to 150° C.

Coils prepared in this way may be subjected to relatively high temperature without damage by blistering, such as commonly encountered when compositions which do not contain a natural resin are subjected to prolonged heating. For example, coils coated with my improved composition have been subjected for long periods to a temperature of about 435° without damage. It is surprising that a composition containing organic material such as shellac should bake out without blistering. Apparently the organic material gradually escapes as the temperature is raised, resulting in small pores which open the surface so that at a higher temperature the combined water may escape without the blistering which occurs when coatings not containing a resin but otherwise similar are subjected to baking temperatures. Coils prepared in accordance with my invention may also be subjected to moisture without damage. Coils thus protected have been soaked in water for as long as twenty-four hours, and upon subsequent drying have been found to be in intact condition. Coils similarly coated with water-glass containing silex but not containing a resin after being soaked in water were found to have had the coating destroyed.

What I claim as new and desire to secure by Letters Patent of the United States, is:

1. An electrical insulating composition capable of withstanding elevated temperature without damage, consisting largely of a silicate of an alkali metal and a lesser proportion of a natural resin.

2. An electrical insulating composition capable of withstanding elevated temperature without damage, consisting of a substantial proportion of sodium silicate and a lesser proportion of shellac.

3. An electrical device which is operable at elevated temperatures coated with a composition comprising an inert filler, a hard natural resin, and a silicate of an alkali metal.

4. A composition comprising an ammoniacal solution of shellac and a silicate of an alkali metal.

5. A resistance coil having a protective and insulating coating containing shellac and a silicate of an alkali metal.

In witness whereof, I have hereunto set my hand, this 17th day of November 1919.

LAWRENCE E. BARRINGER.